United States Patent
Bartik et al.

(10) Patent No.: US 10,601,866 B2
(45) Date of Patent: Mar. 24, 2020

(54) DISCOVERING WEBSITE PHISHING ATTACKS

(71) Applicant: INTERNATIONAL BUSINESS MACHINES CORPORATION, Armonk, NY (US)

(72) Inventors: Avishay Bartik, Be'er Sheva (IL); Alon Freund, Maale Adumim (IL); Aviv Ron, Klachim (IL); Shahaf Stein, Rishon LeZion (IL)

(73) Assignee: International Business Machines Corporation, Armonk, NY (US)

( * ) Notice: Subject to any disclaimer, the term of this patent is extended or adjusted under 35 U.S.C. 154(b) by 240 days.

(21) Appl. No.: 15/684,716

(22) Filed: Aug. 23, 2017

(65) Prior Publication Data
US 2019/0068638 A1  Feb. 28, 2019

(51) Int. Cl.
*H04L 29/06* (2006.01)
*H04L 29/08* (2006.01)

(52) U.S. Cl.
CPC .......... *H04L 63/1483* (2013.01); *H04L 67/02* (2013.01); *H04L 63/1416* (2013.01)

(58) Field of Classification Search
CPC ............ H04L 63/1483; H04L 63/1416; G06K 7/10257; G06K 9/4652
See application file for complete search history.

(56) References Cited

U.S. PATENT DOCUMENTS

| | | | |
|---|---|---|---|
| 8,175,387 B1 * | 5/2012 | Hsieh | G06K 9/6206 382/181 |
| 9,276,956 B2 | 3/2016 | Geng et al. | |
| 9,282,117 B2 | 3/2016 | Schmidtler | |
| 9,356,947 B2 | 5/2016 | Shraim et al. | |
| 9,386,037 B1 | 7/2016 | Hunt et al. | |
| 9,398,038 B2 | 7/2016 | Higbee et al. | |
| 9,398,047 B2 | 7/2016 | Goutal | |
| 2012/0159620 A1 * | 6/2012 | Seifert | H04L 63/1416 726/22 |

(Continued)

FOREIGN PATENT DOCUMENTS

| | | | |
|---|---|---|---|
| CN | 104217160 A | 12/2014 | |
| WO | 2015023316 A1 | 2/2015 | |
| WO | WO-2015039553 A1 * | 3/2015 | ......... H04L 63/1441 |

OTHER PUBLICATIONS

Afroz et al., "PhishZoo: Detecting Phishing Websites by Looking at Them," 2011 Fifth IEEE International Conference on Semantic Computing, 2011, p. 368-375, IEEE Computer Society.

(Continued)

*Primary Examiner* — Ellen Tran
(74) *Attorney, Agent, or Firm* — L. Jeffrey Kelly

(57) ABSTRACT

A method, computer system, and a computer program product for identifying a phishing attack is provided. The present invention may include receiving an alert of a suspicious URL. The present invention may include making an HTTP request to the suspicious URL. The present invention may include downloading and rendering the suspicious URL content. The present invention may include producing a screenshot of the rendered suspicious URL content. The present invention may include making an HTTP request to a domain landing page. The present invention may include downloading and rendering the domain landing page URL content. The present invention may include producing a screenshot of the rendered domain landing page URL content. The present invention may include generating a score based on comparing the produced first screenshot and the produced second screenshot.

20 Claims, 5 Drawing Sheets

(56) References Cited

U.S. PATENT DOCUMENTS

| | | |
|---|---|---|
| 2012/0304295 A1 | 11/2012 | Reumann et al. |
| 2013/0031630 A1 | 1/2013 | Krishnamurthy et al. |
| 2013/0097702 A1* | 4/2013 | Alhamed ............... G06F 21/64 726/22 |
| 2014/0359760 A1* | 12/2014 | Gupta ............... H04L 63/1408 726/22 |
| 2016/0063541 A1 | 3/2016 | Geng et al. |

OTHER PUBLICATIONS

Gupta et al., "bit.ly/malicious: Deep Dive into Short URL based e-Crime Detection," 2014 APWG Symposium on Electronic Crime Research (eCrime), Sep. 23-25, 2014, p. 14-24, IEEE.

Huang et al., "Mitigate Web Phishing Using Site Signatures," TENCON 2010, 2010, p. 803-808, IEEE.

IBM, "Transforming the Approach to Phishing Detection and Protection," IBM Security Thought Leadership White Paper, Mar. 2017, p. 1-7, IBM Corporation, Grace Period Disclosure, IBM Trusteer® Made Publicly Available Dec. 27, 2016.

Mell et al., "The NIST Definition of Cloud Computing," National Institute of Standards and Technology, Sep. 2011, p. 1-3, Special Publication 800-145.

Mutton, "WordPress hosting: Do not try this at home!," Netcraft News, Mar. 24, 2014, p. 1-4, Netcraft Ltd., https://news.netcraft.com/archives/2014/03/24/wordpress-hosting-do-not-try-this-at-home.html, Accessed on Apr. 17, 2017.

\* cited by examiner

US 10,601,866 B2

DISCOVERING WEBSITE PHISHING ATTACKS

STATEMENT REGARDING PRIOR DISCLOSURES BY THE INVENTOR OR A JOINT INVENTOR

Aspects of the present invention have been disclosed by the Applicant, who obtained the subject matter disclosed directly from the inventors, associated with the product IBM Trusteer®, which was made available for limited public use on Dec. 27, 2016 and was disclosed to the public in March of 2017. The following disclosure is submitted under 35 U.S.C. § 102(b)(1)(A).

BACKGROUND

The present invention relates generally to the field of computing, and more particularly to phishing.

Website phishing attacks have become more prevalent and the number of attacks have grown significantly. Phishing attacks can appear to be a trusted website to obtain user data such as a credit card number or login information. Both users of the trusted website and the trusted website entity can fall victim to such cybercrimes. Not detecting phishing attacks may tarnish an entity's brand by attacking the entity's website and may allow cybercriminals to obtain user sensitive data when the sensitive data is entered into a phishing webpage.

SUMMARY

Embodiments of the present invention disclose a method, computer system, and a computer program product for identifying a phishing attack. The present invention may include receiving an alert of a suspicious uniform resource locator (URL). The present invention may also include making a first hypertext transfer protocol (HTTP) request to the suspicious URL based on the received alert. The present invention may then include downloading a plurality of suspicious URL content associated with the suspicious URL to a storage medium based on the first HTTP request. The present invention may further include rendering the downloaded plurality of suspicious URL content. The present invention may also include producing a first screenshot of the rendered plurality of suspicious URL content. The present invention may then include making a second HTTP request to a domain landing page URL based on the received alert. The present invention may further include downloading a plurality of domain landing page URL content associated with the domain landing page URL to the storage medium based on the second HTTP request. The present invention may also include rendering the downloaded plurality of domain landing page URL content. The present invention may then include producing a second screenshot of the rendered plurality of domain landing page URL content. The present invention may further include generating a score based on comparing the produced first screenshot and the produced second screenshot.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
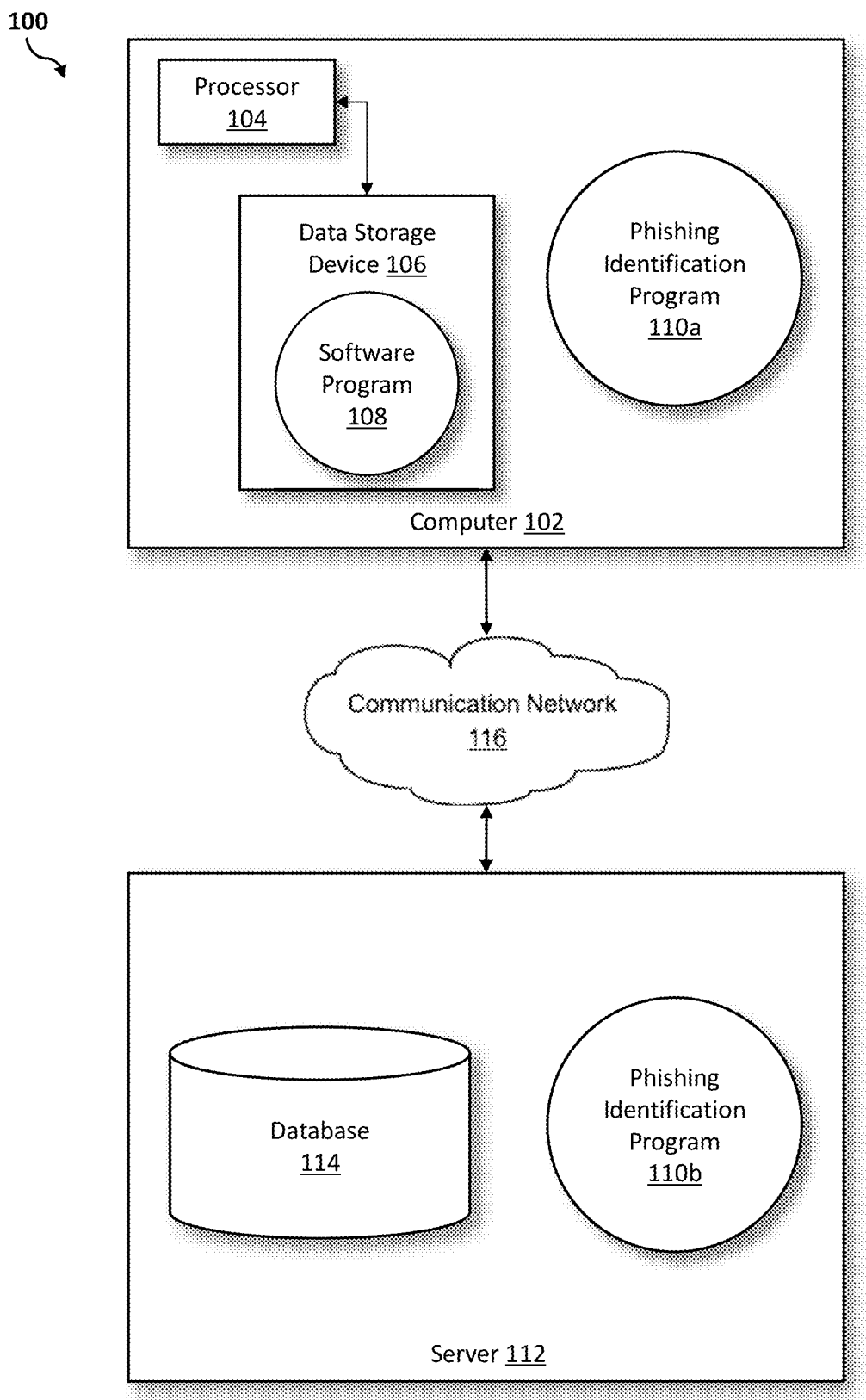
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for identifying a potential phishing website. As such, the present embodiment has the capacity to improve the technical field of phishing attack detection by comparing a legitimate domain landing page with a suspicious uniform resource locator (URL) (i.e., web address). More specifically, a bot may be programmed to access a suspicious URL. The programmed bot may download and render the legitimate domain landing page and the suspicious URL to produce a screenshot to compare similarities of each webpage.

As previously described, website phishing attacks (i.e., cybercrimes) have become more prevalent and the number of attacks have grown significantly. Phishing attacks can appear to be a trusted website to obtain user data such as a credit card number or login information. Both users of the trusted website and the trusted website entity can fall victim to such cybercrimes. Not detecting phishing attacks may tarnish an entity's brand by attacking the entity's website and may allow cybercriminals to obtain user sensitive data when the sensitive data is entered into a phishing webpage.

Phishing attacks may be implemented by an attacker (i.e., cybercriminal) posing as a legitimate institution and sending email messages or text messages to users asking the users to provide sensitive information (e.g., credit card numbers and login information). The email and text messages may ask the user to click on a link that will redirect the user to a bogus (i.e., phishing) webpage that will ask for sensitive data or may activate a malicious script for the cybercriminal to work in the background and gain access to sensitive data. Once the user sensitive data has been obtained by a cybercriminal, the cybercriminal may access, for example, a banking account of a user and transfer money out of the user's bank account. The cybercriminal may also target the institution to gain access to the institution's network.

Phishing attacks may be launched from a legitimate domain name which may be hosted on a legitimate website.

The cybercriminal may find a vulnerability and take control of the legitimate website. The cybercriminal may then inject phishing content into the legitimate website. Phishing content may be content that appears similar to another legitimate website (e.g., a bank's website), however, the content may differ in the user's view (i.e., look and feel) of the attacked website.

By taking control of the entity's legitimate website, the cybercriminal may not need to pay for registering a domain or for hosting the website content. Controlling the legitimate website allows the cybercriminal to avoid investigation since the cybercriminal may not be tied to the infrastructure. The cybercriminal may also not be evaluated in security systems that scan for new domains since the cybercriminal may be piggybacking onto the legitimate websites. Therefore, it may be advantageous to, among other things, create a method to detect phishing attacks by comparing, analyzing and classifying a suspected phishing URL (i.e., suspicious URL) with the legitimate domain landing page (i.e., domain landing page URL) from the entity's website.

According to at least one embodiment, the phishing identification program may compare the suspicious URL with the legitimate domain landing page URL by downloading and rendering both the content from the suspicious URL and the content from the domain landing URL. An example of a legitimate domain landing page URL is http://nosuch.domain and an example of a suspicious URL is http://nosuch.domain/example/phishing. If the suspicious URL content and the domain landing page URL content are distinctively different in look and feel, then it is likely that the suspicious URL is a phishing page. The look and feel of a webpage may, for example, refer to a webpage's logo, location of logo, color, font, design layout, format and navigation menu location. The level of difference or similarity in the look and feel of a webpage may indicate the likelihood that a suspicious URL may or may not be a phishing page. The more similar the look and feel of the compared webpages are, the higher the likelihood that the suspicious URL is not a phishing URL. Alternatively, the less similar the look and feel of the compared webpages are, the higher the likelihood that the suspicious URL is a phishing URL. The level of difference or similarity may be adjusted or tunable to different threshold values (i.e., scores).

Legitimate websites tend to keep a similar look and feel across all website pages, such as placement of the text, the menu bar, the logo, the colors, the tabs and fonts. If the phishing identification program fails to find such similarities when comparing the content of the suspicious URL and the domain landing page URL, then the likelihood that the suspicious URL is a phishing site is high. The phishing identification program may view the end result that a user can see (i.e., the screen shots of the URLs) and may not fall victim to the cybercriminal planting invisible document object management (DOM) elements not seen by the user.

The phishing identification program may be triggered to run a webpages comparison algorithm to compare the content of the suspicious URL and the domain landing page URL by a user's antivirus software or a phishing email that may ask a user to click on a link. An example of a phishing email may include an email alerting a user that the user's bank password needs to be changed with a link that appears to be from the user's bank. After the user clicks on the email link, the link will take the user to a webpage that appears to look like the legitimate bank website, however, the webpage may have been falsified by a cybercriminal and may be a suspected URL. An example of antivirus software triggering the phishing identification program may occur when a user downloads antivirus software on the user's computer. The user may go to a bank website and enter the user's bank login credentials on a webpage that is different than the bank webpage. The antivirus software may flag the different login webpage being accessed by the user and send an alert to the user or to the phishing identification program. The phishing identification program may then run an algorithm to decide if the website is a phishing website.

The present embodiment may use a bot (i.e., a headless browser, an internet bot or a web robot) to perform automated tasks over the internet. A bot may be a software application that performs simple and repetitive tasks over the internet. The bot may be programmed to make hypertext transfer protocol (HTTP) requests to access suspicious URLs, download and render URL content and produce a screenshot of the final rendered webpage. Then the bot may use the same process (i.e., download and render URL content and produce a screenshot of the final rendered webpage) for the domain landing page URL. After the final screenshots are produced from both the suspicious URL and the domain landing page URL, the phishing identification program may compare the similarity of the two pages based on the downloaded content (e.g., HyperText Markup Language Document Object Model (HTML DOM), images scripts, etc.) and the rendered screenshots using page similarity algorithms, for example a Gaussian based algorithm, for keypoint extraction and a histogram-based algorithm.

The comparison may apply a keypoint extraction algorithm (e.g., KAZE or scale-invariant feature transform SIFT) to match the two screenshots. If the two screenshots contain a large number of matching keypoints, then the screenshots are considered similar and the suspicious URL receives a low phishing score. Alternatively, if the two screenshots contain a low number of matching keypoints, then the screenshots are not considered to be similar and the suspicious URL receives a high phishing score. A high similarity between the screenshots may relate to a benign URL (i.e., domain landing page URL) and a low similarity between the screenshots may relate to a suspicious URL.

One score produced by the phishing identification program may include keypoint extraction and may be applied to the boundaries of the screenshots, such as the top, left, right and bottom of the screenshot pages. The weight of the score may be higher (i.e., have a greater affect) when associated with the outer boundaries of the screenshots and the weight of the score may be lower when associated with the center of the screenshots since the center of the screenshots may be more dynamic in nature. The outer boundaries of the domain landing URL pages typically maintain a similar look and feel or may even maintain the exact look and feel of a webpage while the content in the middle may be dynamic and may not maintain a general scheme.

One other score produced by the phishing identification program may include a color histogram comparison, using a histogram-based algorithm, between the previously produced screenshots of the suspicious URL and the domain landing page URL. The comparison may result in a low phishing score if the two produced screenshots share a similar color histogram. Alternatively, if the color histograms are not similar, the phishing score will be higher and the suspicious URL will be considered to be a phishing URL.

One other score produced by the phishing identification program may include a text comparison between the suspicious URL and the domain landing page URL. The text may be extracted from the HTML DOM or extracted from the screenshot using optical character recognition (OCR). The extracted text may then be compared using different algorithms for finding commonalities of words between two sets of words. The comparison may result in a low phishing score if the two pages share a relatively large number of common words from the total amount of words in each. Alternatively, if the pages share a low number of common words in the text, the phishing score will be higher and the suspicious URL will be considered to be a phishing URL.

One other score produced by the phishing identification program may include a HTML DOM structure comparison of the suspicious URL and the domain landing page URL. The HTML DOM may be compared using different algorithms for finding commonalities of trees, since the HTML DOM can be represented as a tree. The comparison may take into account the type of each element in the HTML DOM (e.g., INPUT, DIV, and BODY) and the element's location on the tree. The comparison may result in a low phishing score if the two pages share a relatively large common subset of the tree from the total size of the tree. Alternatively, if the pages share a small subset of the tree, the phishing score may be higher and the suspicious URL may be considered to be a phishing URL.

The scores previously described are examples of techniques for finding similarity between two webpages and the scores may be combined to produce a single score or may be scored separately. According to at least one embodiment, the present embodiment combines the keypoint extraction score and the color histogram score into a single score. The scoring may be tunable to accommodate various thresholds, for example, a score of the comparison between the suspicious URL screenshots and the domain landing page URL screenshots being more than 50% similar in look and feel may indicate a benign URL and less than 50% similarity in look and feel may indicate a suspicious URL.

An example of a phishing attack is when a cybercriminal piggybacks the phishing URL on a legitimate entity domain landing URL, such as a legitimate company that sells products. The cybercriminal will use the legitimate URL (e.g., http://legitimateproducts.domain) and piggyback the phishing URL (e.g., http://legitimateproducts.domain/phishing) as an extension of the legitimate URL. The cybercriminal will make the phishing URL look like a legitimate online banking website, however, the legitimate URL may be from a company that sells products. The legitimate company's logo and website colors are blue and grey but the phishing URL contains the website color of purple. The URL webpage look and feel between the legitimate URL and the phishing URL differ by having different folders, different font, different colors and a different login location. The phishing identification program would score both the keypoint extraction score and the color histogram score with low scores (i.e., not similar in look and feel) and would identify the suspicious URL as a phishing URL.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a phishing identification program 110a. The networked computer environment 100 may also include a server 112 that is enabled to run a phishing identification program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the phishing identification program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the phishing identification program 110a, 110b (respectively) to identify phishing attacks. The phishing attack identification method is explained in more detail below with respect to FIG. 2.

Figure 2:
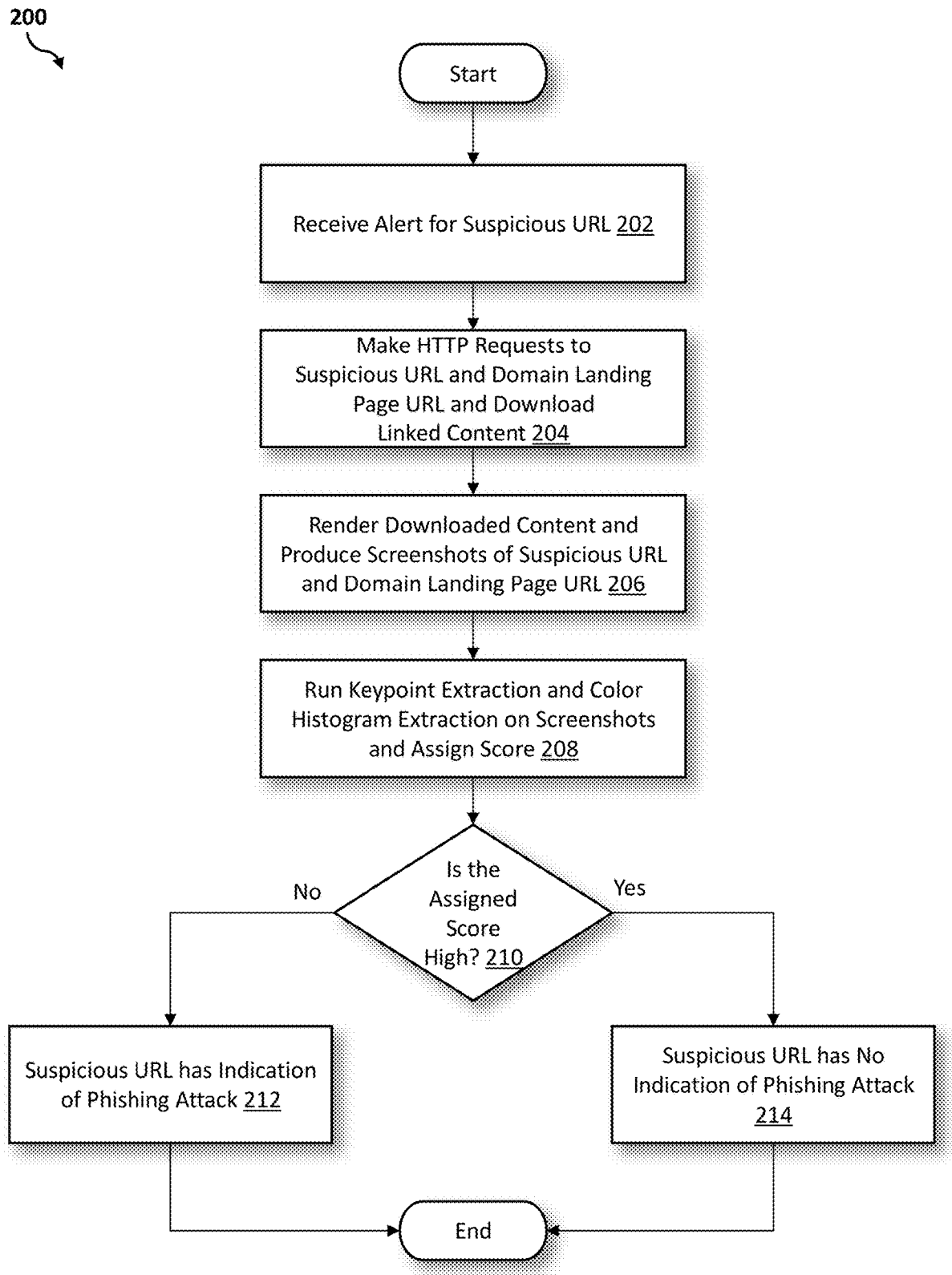
FIG. 2 is an operational flowchart illustrating a process for identifying phishing attacks according to at least one embodiment.

Referring now to FIG. 2, an operational flowchart illustrating the exemplary phishing attack identification process 200 used by the phishing identification program 110a, 110b according to at least one embodiment is depicted.

At 202, an alert is received for a suspicious URL. An alert may trigger a webpages comparison algorithm within the phishing identification program 110a, 110b. The phishing identification program 110a, 110b may, for example, run on a user computer (e.g., computer 102), an entity server (e.g., server 112) or a bot. An alert may be from another software program running on the user computer or an entity server or the alert may be from an individual who has access to or has installed the phishing identification program 110a, 110b, and the individual suspects a URL is a phishing URL.

One example of an alert may include a bank customer that receives an email from what appears to be the customer's bank. The content of the email notifies the customer of an urgent reason to reset the customer's bank password and provides a link. Once the customer clicks on the link, the link redirects the customer to a webpage that was created to appear the same as the bank website webpages, however, the URL is not the bank's URL. Once the customer enters their username and password into the linked URL, the username and password are received by the webpage that is not the bank webpage, resulting in a cybercriminal stealing the customer bank data. The customer's antivirus software may notice the linked URL is different than the normal bank URL and send an alert. The customer's antivirus software may also provide an alert if the customer enters username, password or credit card data into a website that may be suspicious to the antivirus software, triggering the phishing identification program 110a, 110b algorithm.

Then at 204, an HTTP request is made to the suspicious URL and the domain landing URL and the linked content is downloaded. The phishing identification program 110a, 110b may, via a computer 102, a server 112 or a bot, access the suspicious URL by making an HTTP request to the suspicious URL and the domain landing URL. After the HTTP request is made, the computer 102, the server 112 or the bot may download all content from both the suspicious URL and the domain landing URL. The content may be downloaded to a data storage device (e.g., data storage device 106) or downloaded to a database (e.g., database 114) via a communication network 116. Continuing from the previous example, the customer's antivirus software triggers the phishing identification program 110a, 110b to make an HTTP request to the linked URL and the bank's URL and download the content onto a data storage device.

Next at 206, the downloaded content is rendered and screenshots of the suspicious URL and the domain landing page URL are produced. Rendering URL content may consist of processing the downloaded content image to generate a screenshot (i.e., a realistic image of the webpage). Continuing from the previous example, once the content from the linked URL and the content from the bank's URL are downloaded into a database, the downloaded content is rendered to produce screenshots of the downloaded URLs to view the URLs the way a user would see the webpages on the user's computer screen.

At 208, a keypoint extraction and a color histogram extraction are processed and a score is assigned. Keypoint extraction is a method of image processing used to compare screenshots for similarities between keypoints. Keypoint extraction software may include KAZE or Scale Invariant Feature Transform (SIFT), both of which run algorithms that detect image features. Color histogram extraction obtains color values from an image and from pixels. A color histogram may represent a distribution of colors in an image. Keypoint extraction and color histogram extraction of the downloaded URL content may compare the look, feel and visual features of each URL. The phishing identification program 110a, 110b may emphasize comparing the screenshots (i.e., realistic images of the webpages) boundaries of the webpages, such as the top, right, left and bottom with top of the webpage screenshot having the highest weight (i.e., have a greater affect) on the score. The varying weights of the score may be produced based on the location of the screenshot being evaluated and compared since the top of a webpage image may typically be maintained with the same look as the other URLs for a particular domain landing page. For example, the website folders, colors and logos typically are placed on the top of a website and the center of website is, typically, dynamic in nature. The center of a web site may not maintain a general scheme and have, for example, a company's products displayed in the center and each different webpage within a domain landing page may have different products in the center of the screen for each different webpage.

A score may be assigned by the phishing identification program 110a, 110b after processing and comparing the suspicious URL screenshot content with the domain landing page URL screenshot content. If a large portion of the keypoints and the colors match between the suspicious URL and the domain landing URL, then the comparison indicates the compared webpages are likely similar and likely benign (i.e., the suspicious URL is not a phishing URL). However, if the comparison produces few matching keypoints and colors, then the suspicious URL is likely a phishing URL.

Then at 210, the phishing identification program 110a, 110b determines if the assigned score is high. The score may be tunable for multiple different thresholds. A score range, for example, may be from 0 to 1 or 0% to 100%. The threshold to distinguish between a high score and a low score may be changed or created by preference based on how different the screenshots would need to be to be considered a phishing URL.

If the phishing identification program 110a, 110b determined that the assigned score is low at 210, then the URL is classified as having an indication of a phishing attack at 212. For example, if the score range is between 0 and 1, a threshold score is 0.5, and the assigned score produced by the phishing identification program 110a, 110b is a 0.3, then the compared URLs have a low similarity and are considered to not be owned or produced by the same entity. Therefore, the suspected URL is considered a phishing URL based on the keypoint extraction comparison combined with the color histogram comparison score since a score below the threshold value may be considered low and is an indication of a phishing attack.

If the phishing identification program 110a, 110b determined that the assigned score is high at 210, then the URL is classified as having no indication of a phishing attack at 214. For example, if the score range is between 0 and 1, a threshold score is 0.5, and the comparison between the suspicious URL and the domain landing URL produced by the phishing identification program 110a, 110b is a 0.7, then the compared URLs have a high similarity and are considered benign (i.e., the suspicious URL is not a phishing URL).

It may be appreciated that FIG. 2 provides only an illustration of one embodiment and does not imply any limitations with regard to how different embodiments may be implemented. Many modifications to the depicted embodiment(s) may be made based on design and implementation requirements.

Figure 3:
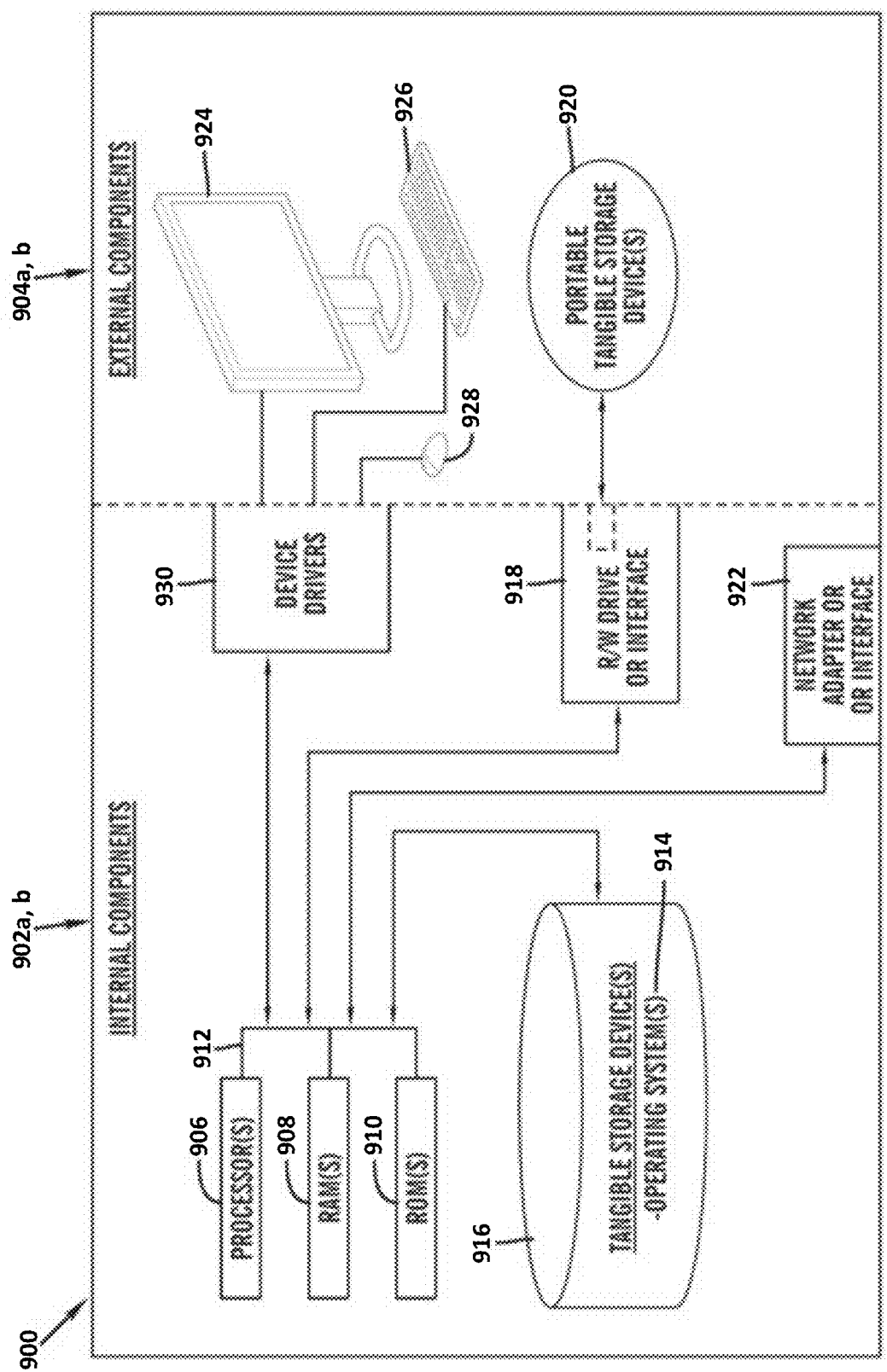
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 3. Each of the sets of internal components 902 a, b includes one or more processors 906, one or more computer-readable RAMs 908, and one or more computer-readable ROMs 910 on one or more buses 912, and one or more operating systems 914 and one or more computer-readable tangible storage devices 916. The one or more operating systems 914, the software program 108 and the phishing identification program 110a in client computer 102, and the phishing identification program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the phishing identification program 110a, 110b can be stored on one or more of the respective portable computer-readable tangible storage devices 920, read via the respective R/W drive or interface 918, and loaded into the respective hard drive 916.

Each set of internal components 902 a, b may also include network adapters (or switch port cards) or interfaces 922 such as a TCP/IP adapter cards, wireless Wi-Fi interface cards, or 3G or 4G wireless interface cards or other wired or wireless communication links. The software program 108 and the phishing identification program 110a in client computer 102 and the phishing identification program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the phishing identification program 110a in client computer 102 and the phishing identification program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926, and computer mouse 928. The device drivers 930, R/W drive or interface 918, and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
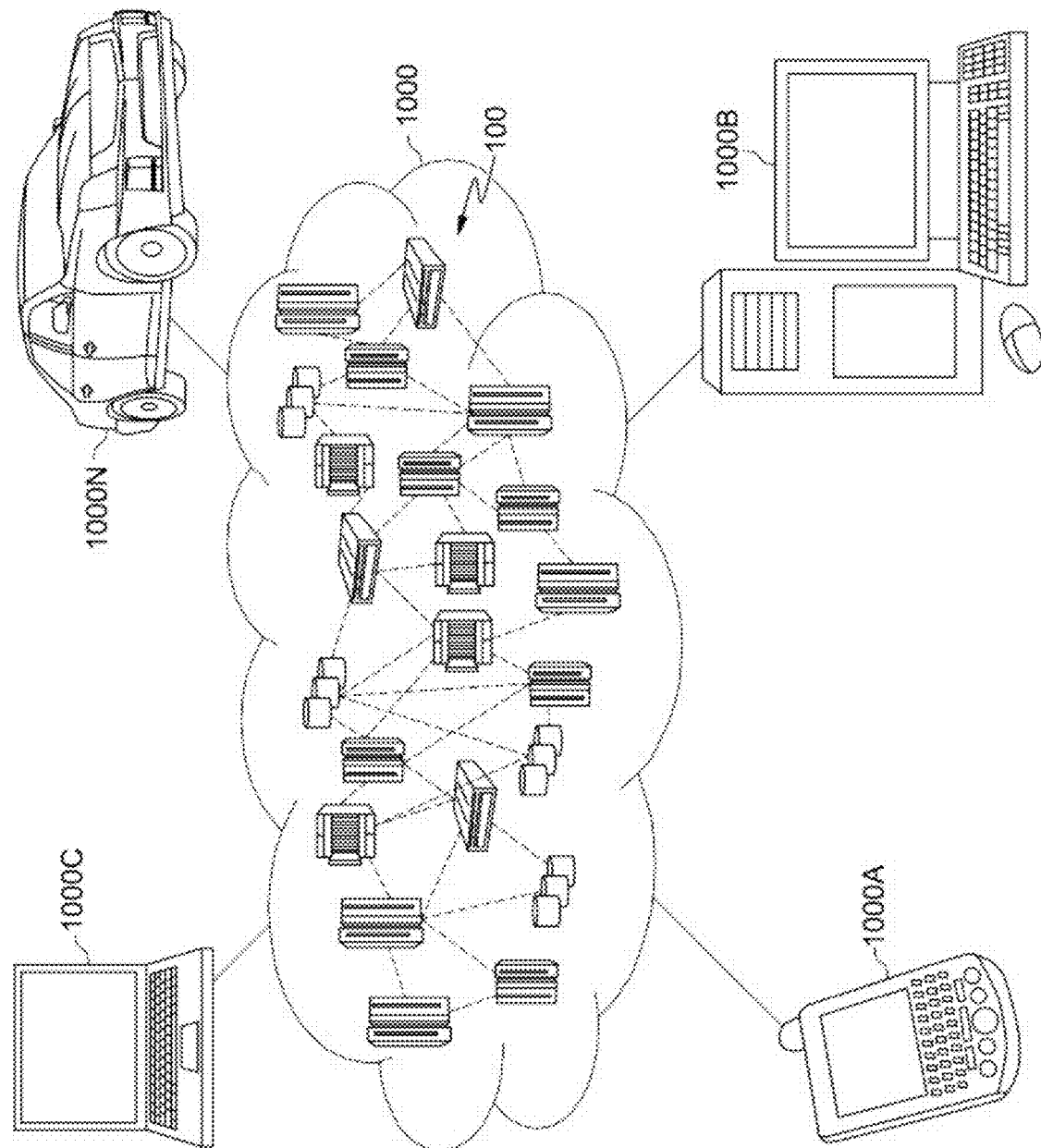
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
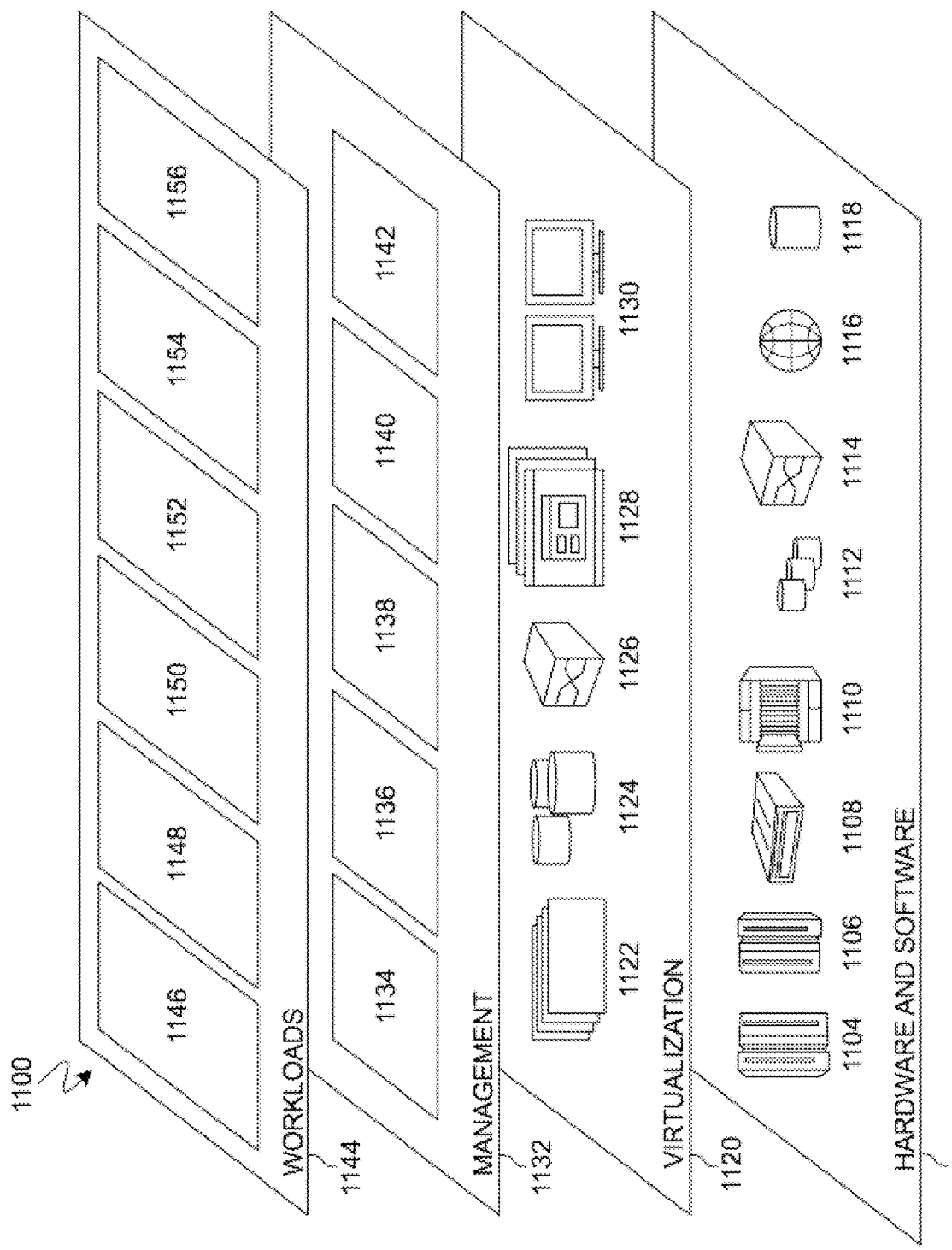
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and phishing identification 1156. A phishing identification program 110a, 110b provides a way to identify phishing attacks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for identifying a phishing attack, the method comprising:

receiving an alert of a suspicious uniform resource locator (URL);

making a first hypertext transfer protocol (HTTP) request to the suspicious URL based on the received alert;

downloading a plurality of suspicious URL content associated with the suspicious URL to a storage medium based on the first HTTP request;

rendering the downloaded plurality of suspicious URL content;

producing a first screenshot of the rendered plurality of suspicious URL content;

making a second HTTP request to a domain landing page URL based on the received alert;

downloading a plurality of domain landing page URL content associated with the domain landing page URL to the storage medium based on the second HTTP request;

rendering the downloaded plurality of domain landing page URL content;

producing a second screenshot of the rendered plurality of domain landing page URL content; and generating a score based on comparing the produced first screenshot and the produced second screenshot, wherein the generated score is based on assigning varying weights to sections of each produced screenshot, wherein boundaries of each produced screenshot have a higher weight on the score than a center portion of each screenshot.

2. The method of claim 1, further comprising:
running a keypoint extraction comparison of the produced first screenshot and the produced second screenshot; and
producing a score from the keypoint extraction.

3. The method of claim 1, further comprising:
running a color histogram extraction comparison of the produced first screenshot and the produced second screenshot; and
producing a score from the color histogram extraction.

4. The method of claim 1, further comprising:
running a keypoint extraction comparison of the produced first screenshot and the produced second screenshot;
running a color histogram extraction comparison of the produced first screenshot and the produced second screenshot; and
producing a combined score from the keypoint extraction and the color histogram extraction.

5. The method of claim 1, further comprising:
determining a low score based on a threshold and the generated score; and
determining the suspicious URL is a phishing URL based on the determined low score.

6. The method of claim 1, further comprising:
determining a high score based on a threshold and the generated score; and
determining the suspicious URL is not a phishing URL based on the determined high score.

7. The method of claim 1, wherein the suspicious URL is triggered by an antivirus software program, and wherein a bot is programmed to make at least one HTTP request to access and download the plurality of suspicious URL content and the plurality of domain landing page URL content.

8. The method of claim 1, wherein the generated score is weighted more along at least one border of the compared first screenshot and second screenshot, and wherein the borders include a top portion, a right portion, a bottom portion and a left portion of the screenshot.

9. A computer system for identifying a phishing attack, comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
receiving an alert of a suspicious uniform resource locator (URL);
making a first hypertext transfer protocol (HTTP) request to the suspicious URL based on the received alert;
downloading a plurality of suspicious URL content associated with the suspicious URL to a storage medium based on the first HTTP request;
rendering the downloaded plurality of suspicious URL content;
producing a first screenshot of the rendered plurality of suspicious URL content;
making a second HTTP request to a domain landing page URL based on the received alert;
downloading a plurality of domain landing page URL content associated with the domain landing page URL to the storage medium based on the second HTTP request;
rendering the downloaded plurality of domain landing page URL content;
producing a second screenshot of the rendered plurality of domain landing page URL content; and
generating a score based on comparing the produced first screenshot and the produced second screenshot, wherein the generated score is based on assigning varying weights to sections of each produced screenshot, wherein boundaries of each produced screenshot have a higher weight on the score than a center portion of each screenshot.

10. The computer system of claim 9, further comprising:
running a keypoint extraction comparison of the produced first screenshot and the produced second screenshot; and
producing a score from the keypoint extraction.

11. The computer system of claim 9, further comprising:
running a color histogram extraction comparison of the produced first screenshot and the produced second screenshot; and
producing a score from the color histogram extraction.

12. The computer system of claim 9, further comprising:
running a keypoint extraction comparison of the produced first screenshot and the produced second screenshot;
running a color histogram extraction comparison of the produced first screenshot and the produced second screenshot; and
producing a combined score from the keypoint extraction and the color histogram extraction.

13. The computer system of claim 9, further comprising:
determining a low score based on a threshold and the generated score; and
determining the suspicious URL is a phishing URL based on the determined low score.

14. The computer system of claim 9, further comprising:
determining a high score based on a threshold and the generated score; and
determining the suspicious URL is not a phishing URL based on the determined high score.

15. The computer system of claim 9, wherein the suspicious URL is triggered by an antivirus software program, and wherein a bot is programmed to make at least one HTTP request to access and download the plurality of suspicious URL content and the plurality of domain landing page URL content.

16. The computer system of claim 9, wherein the generated score is weighted more along at least one border of the compared first screenshot and second screenshot, and wherein the borders include a top portion, a right portion, a bottom portion and a left portion of the screenshot.

17. A computer program product for identifying a phishing attack, comprising:
one or more non-transitory computer-readable storage media and program instructions stored on at least one of the one or more non-transitory tangible storage media, the program instructions executable by a processor to cause the processor to perform a method comprising:
program instructions to receive an alert of a suspicious uniform resource locator (URL);

program instructions to make a first hypertext transfer protocol (HTTP) request to the suspicious URL based on the received alert;

program instructions to download a plurality of suspicious URL content associated with the suspicious URL to a storage medium based on the first HTTP request;

program instructions to render the downloaded plurality of suspicious URL content;

program instructions to produce a first screenshot of the rendered plurality of suspicious URL content;

program instructions to make a second HTTP request to a domain landing page URL based on the received alert;

program instructions to download a plurality of domain landing page URL content associated with the domain landing page URL to the storage medium based on the second HTTP request;

program instructions to render the downloaded plurality of domain landing page URL content;

program instructions to produce a second screenshot of the rendered plurality of domain landing page URL content; and program instructions to generate a score based on comparing the produced first screenshot and the produced second screenshot, wherein the generated score is based on assigning varying weights to sections of each produced screenshot, wherein boundaries of each produced screenshot have a higher weight on the score than a center portion of each screenshot.

18. The computer program product of claim 17, further comprising:

program instructions to run a keypoint extraction comparison of the produced first screenshot and the produced second screenshot; and program instructions to produce a score from the keypoint extraction.

19. The computer program product of claim 17, further comprising:

program instructions to run a color histogram extraction comparison of the produced first screenshot and the produced second screenshot; and program instructions to produce a score from the color histogram extraction.

20. The computer program product of claim 17, further comprising:

program instructions to run a keypoint extraction comparison of the produced first screenshot and the produced second screenshot;

program instructions to run a color histogram extraction comparison of the produced first screenshot and the produced second screenshot; and program instructions to produce a combined score from the keypoint extraction and the color histogram extraction.

* * * * *